United States Patent
Locke

(10) Patent No.: US 10,769,854 B2
(45) Date of Patent: Sep. 8, 2020

(54) HOLOGRAPHIC TECHNOLOGY IMPLEMENTED SECURITY SOLUTION

(71) Applicant: TYCO FIRE & SECURITY GMBH, Neuhausen am Rheinfall (CH)

(72) Inventor: Robert B. Locke, Sonoma, CA (US)

(73) Assignee: TYCO FIRE & SECURITY GMBH, Neuhausen am Rheinfall (CH)

(*) Notice: Subject to any disclaimer, the term of this patent is extended or adjusted under 35 U.S.C. 154(b) by 0 days.

(21) Appl. No.: 15/379,657

(22) Filed: Dec. 15, 2016

(65) Prior Publication Data

US 2018/0018823 A1 Jan. 18, 2018

Related U.S. Application Data

(60) Provisional application No. 62/361,053, filed on Jul. 12, 2016, provisional application No. 62/361,669, filed on Jul. 13, 2016.

(51) Int. Cl.
*H04N 13/20* (2018.01)
*H04N 13/204* (2018.01)
(Continued)

(52) U.S. Cl.
CPC .......... *G06T 19/006* (2013.01); *G02B 27/017* (2013.01); *G06F 3/005* (2013.01); *G06F 3/017* (2013.01); *G06F 3/1446* (2013.01); *G06F 3/16* (2013.01); *G06F 3/167* (2013.01); *G06F 40/117* (2020.01); *G06F 40/169* (2020.01); *G06F 40/205* (2020.01); *G06K 9/00288* (2013.01); *G06K 9/00362* (2013.01); *G06K 9/00671* (2013.01); *G06K 9/00771* (2013.01); *G06N 3/006* (2013.01); *G06N 5/043* (2013.01); *G06Q 30/0201* (2013.01); *G06Q 30/0269* (2013.01); *G06Q 50/01* (2013.01); *G07C 9/257* (2020.01); *G10L 15/22* (2013.01); *G10L 15/26* (2013.01); *H04N 7/183* (2013.01);
(Continued)

(58) Field of Classification Search
CPC ........ G06F 3/005; G06F 3/017; G06F 3/1446; G06T 19/006; H04N 13/0203; H04N 13/044; H04N 13/0497; H04N 13/204; H04N 13/344; H04N 13/398; H04N 7/181
See application file for complete search history.

(56) References Cited

U.S. PATENT DOCUMENTS 5,357,148 A 10/1994 Rotay
7,249,064 B1 7/2007 Carmen
(Continued)

OTHER PUBLICATIONS

"*Microsoft HoloLens*," Wikipedia, (May 3, 2018), (Retrieved from the Internet): https://en.wikipedia.org/wiki/Microsoft_HoloLens.
(Continued)

*Primary Examiner* — Jessica M Prince
(74) *Attorney, Agent, or Firm* — Foley & Lardner LLP

(57) ABSTRACT

Disclosed are techniques that use mixed reality, e.g., augmented reality and virtual reality technologies to improve analysis of security situations as well as retail processes and activity in retail stores. For security these techniques merge the physical world embodied in security systems with the virtual world of policies and analytics. In the retail aspect, these techniques merge the physical world of retail items, displays, and spaces with the virtual world of policies and analytics.

20 Claims, 6 Drawing Sheets

(51) Int. Cl.
| | |
|---|---|
| *G06T 19/00* | (2011.01) |
| *H04N 7/18* | (2006.01) |
| *G06N 3/00* | (2006.01) |
| *G06K 9/00* | (2006.01) |
| *G07C 9/25* | (2020.01) |
| *G06F 40/117* | (2020.01) |
| *G06F 40/169* | (2020.01) |
| *G06F 40/205* | (2020.01) |
| *H04N 13/344* | (2018.01) |
| *H04N 13/398* | (2018.01) |
| *G06F 3/00* | (2006.01) |
| *G06F 3/01* | (2006.01) |
| *G06F 3/14* | (2006.01) |
| *G06Q 30/02* | (2012.01) |
| *H04N 13/332* | (2018.01) |
| *G06F 3/16* | (2006.01) |
| *G06N 5/04* | (2006.01) |
| *G06Q 50/00* | (2012.01) |
| *G10L 15/22* | (2006.01) |
| *G10L 15/26* | (2006.01) |
| *G02B 27/01* | (2006.01) |
| *G08B 13/196* | (2006.01) |
| *G06T 19/20* | (2011.01) |
| *G10L 15/30* | (2013.01) |

(52) U.S. Cl.
CPC ......... *H04N 13/204* (2018.05); *H04N 13/332* (2018.05); *H04N 13/344* (2018.05); *H04N 13/398* (2018.05); *G02B 2027/014* (2013.01); *G02B 2027/0134* (2013.01); *G02B 2027/0141* (2013.01); *G06T 19/20* (2013.01); *G06T 2219/004* (2013.01); *G08B 13/19608* (2013.01); *G08B 13/19656* (2013.01); *G10L 15/30* (2013.01); *G10L 2015/223* (2013.01)

(56) References Cited

U.S. PATENT DOCUMENTS

| | | | |
|---|---|---|---|
| 8,009,100 | B2 | 8/2011 | Falk |
| 8,223,088 | B1* | 7/2012 | Gomez .............. G06F 3/03547 345/7 |
| 8,965,460 | B1 | 2/2015 | Rao et al. |
| 9,672,707 | B2 | 6/2017 | Kerzner |
| 9,721,373 | B2 | 8/2017 | Marsella |
| 9,811,990 | B2 | 11/2017 | Kerzner |
| 9,823,744 | B2 | 11/2017 | Publicover et al. |
| 10,049,544 | B2 | 8/2018 | Kerzner |
| 2002/0003571 | A1 | 1/2002 | Schofield et al. |
| 2002/0073333 | A1 | 6/2002 | Palka et al. |
| 2002/0147982 | A1 | 10/2002 | Naidoo et al. |
| 2003/0025599 | A1 | 2/2003 | Monroe |
| 2003/0158771 | A1 | 8/2003 | Shen et al. |
| 2004/0075738 | A1 | 4/2004 | Burke et al. |
| 2004/0105570 | A1 | 6/2004 | Venetianer et al. |
| 2004/0125207 | A1 | 7/2004 | Mittal et al. |
| 2005/0010649 | A1 | 1/2005 | Payne et al. |
| 2005/0137890 | A1 | 6/2005 | Bhatt et al. |
| 2005/0184867 | A1 | 8/2005 | Osann, Jr. |
| 2005/0207487 | A1* | 9/2005 | Monroe .......... G08B 13/19628 375/240.01 |
| 2006/0136575 | A1 | 6/2006 | Payne et al. |
| 2006/0179463 | A1 | 8/2006 | Chisholm et al. |
| 2007/0072662 | A1 | 3/2007 | Templeman |
| 2008/0071559 | A1 | 3/2008 | Arrasvuori |
| 2008/0189169 | A1 | 8/2008 | Turpin et al. |
| 2008/0246136 | A1 | 10/2008 | Haba et al. |
| 2009/0022362 | A1 | 1/2009 | Gagvani et al. |
| 2009/0102859 | A1 | 4/2009 | Athsani et al. |
| 2009/0267836 | A1 | 10/2009 | Falk |
| 2010/0225006 | A1 | 9/2010 | Haba et al. |
| 2011/0058036 | A1* | 3/2011 | Metzger ................ H04N 7/181 348/143 |
| 2011/0090334 | A1 | 4/2011 | Hicks et al. |
| 2011/0167010 | A1 | 7/2011 | Soppera et al. |
| 2011/0169637 | A1 | 7/2011 | Siegler et al. |
| 2011/0213664 | A1 | 9/2011 | Osterhout et al. |
| 2011/0225069 | A1 | 9/2011 | Cramer et al. |
| 2011/0254680 | A1 | 10/2011 | Perkinson et al. |
| 2012/0188072 | A1 | 7/2012 | Dawes et al. |
| 2012/0195464 | A1 | 8/2012 | Ahn |
| 2012/0242698 | A1 | 9/2012 | Haddick et al. |
| 2012/0290521 | A1 | 11/2012 | Frank et al. |
| 2013/0050262 | A1 | 2/2013 | Jeon |
| 2013/0065390 | A1 | 3/2013 | Haba et al. |
| 2013/0120135 | A1 | 5/2013 | Benson et al. |
| 2013/0241760 | A1 | 9/2013 | Chen et al. |
| 2014/0002236 | A1 | 1/2014 | Pineau et al. |
| 2014/0081858 | A1 | 3/2014 | Block et al. |
| 2014/0160250 | A1 | 6/2014 | Pomerantz et al. |
| 2014/0180972 | A1 | 6/2014 | Boldyrev et al. |
| 2014/0236903 | A1 | 8/2014 | Dirienzo |
| 2014/0344420 | A1 | 11/2014 | Rjeili et al. |
| 2014/0361956 | A1 | 12/2014 | Mikhailov et al. |
| 2015/0020086 | A1 | 1/2015 | Chen et al. |
| 2015/0112826 | A1 | 4/2015 | Crutchfield, Jr. |
| 2015/0254972 | A1 | 9/2015 | Patterson et al. |
| 2015/0317418 | A1* | 11/2015 | Sankarapandian ..... G06F 30/20 703/1 |
| 2015/0317501 | A1 | 11/2015 | Safai et al. |
| 2016/0020948 | A1 | 1/2016 | Janz et al. |
| 2016/0062459 | A1 | 3/2016 | Publicover et al. |
| 2016/0070343 | A1* | 3/2016 | Li .......................... G06F 3/011 345/633 |
| 2016/0085302 | A1 | 3/2016 | Publicover et al. |
| 2016/0124071 | A1 | 5/2016 | Baxley et al. |
| 2016/0209648 | A1 | 7/2016 | Haddick et al. |
| 2016/0232777 | A1 | 8/2016 | Jedwab |
| 2016/0267759 | A1* | 9/2016 | Kerzner ................ G06T 19/006 |
| 2016/0269491 | A1* | 9/2016 | Eom .................... G06T 11/001 |
| 2016/0274660 | A1 | 9/2016 | Publicover et al. |
| 2016/0316189 | A1 | 10/2016 | Lee et al. |
| 2017/0039829 | A1 | 2/2017 | Kerzner |
| 2017/0090556 | A1* | 3/2017 | Baba ........................ G09G 5/00 |
| 2017/0263091 | A1 | 9/2017 | Kerzner |
| 2017/0368439 | A1 | 12/2017 | Khazanov et al. |
| 2018/0018681 | A1 | 1/2018 | Locke et al. |
| 2018/0018708 | A1 | 1/2018 | Locke et al. |
| 2018/0018823 | A1 | 1/2018 | Cianciolo et al. |
| 2018/0018824 | A1 | 1/2018 | Locke et al. |
| 2018/0018862 | A1 | 1/2018 | Kerzner |
| 2018/0018867 | A1 | 1/2018 | Locke et al. |
| 2018/0268219 | A1 | 9/2018 | Miller et al. |
| 2018/0286134 | A1 | 10/2018 | Warhol |
| 2018/0303667 | A1 | 10/2018 | Peyman |
| 2018/0350217 | A1 | 12/2018 | Kerzner |

OTHER PUBLICATIONS

Sala et al., Personal Identification Through 3D Biometric Measurements Based on Stereoscopic Image Pairs, 2006.
Notice of Allowance for U.S. Appl. No. 15/381,588, dated Jul. 5, 2018, 8 pages.
Office Action for U.S. Appl. No. 15/381,396, dated Jun. 28, 2018, 23 pages.
Office Action for U.S. Appl. No. 15/381,588, dated Dec. 12, 2017, 9 pages.
Final Office Action on U.S. Appl. No. 15/381,396 dated Jan. 17, 2019.
Non-Final Office Action on U.S. Appl. No. 15/379,647 dated Dec. 14, 2018.

* cited by examiner

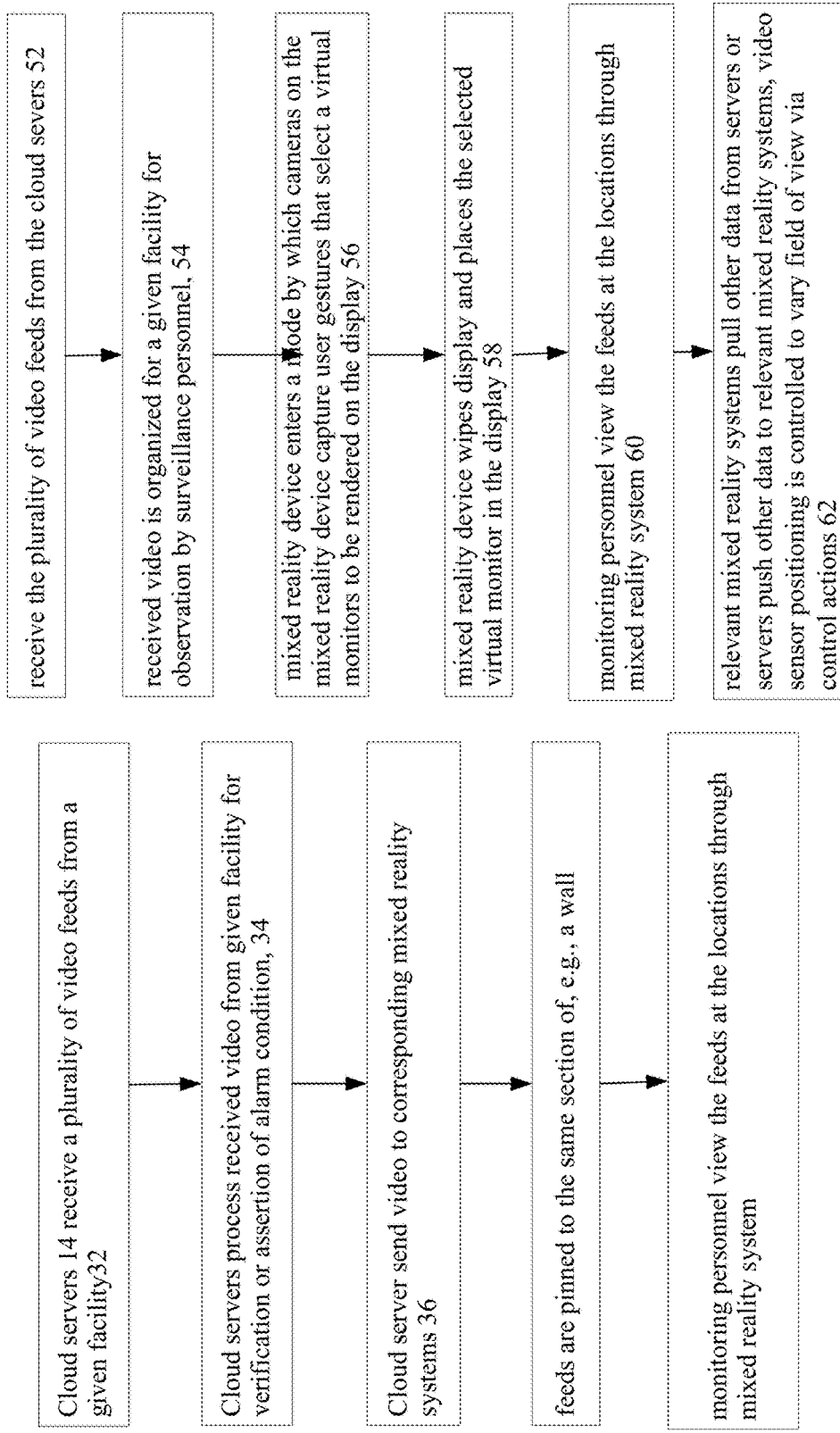

HOLOGRAPHIC TECHNOLOGY IMPLEMENTED SECURITY SOLUTION

CLAIM OF PRIORITY

This application claims priority under 35 U.S.C. § 119(e) to provisional U.S. Patent Application 62/361,053, filed on Jul. 12, 2016, entitled: "Holographic Technology Implemented Security and Retail Solutions" the entire contents of which is incorporated herein by reference and provisional U.S. Patent Application 62/361,669, filed on Jul. 13, 2016, entitled: "Holographic Technology Implemented Security and Retail Solutions the entire contents of which is incorporated herein by reference.

BACKGROUND

This description relates to intrusion, surveillance and alarm systems of various types (generally security systems) and integrated versions of such security systems that combine two or more of such systems.

It is common for businesses and homeowners to have a security system for detecting alarm conditions at their facility and signaling the conditions to a monitoring station or authorized users of the security system. For example, such buildings employ systems in the areas of fire detection, smoke detection, intrusion detection, access control, video surveillance etc.

Virtual guard tour services are known in which personnel at monitoring centers access various video feeds from cameras deployed in a protected facility, e.g., a building or a facility, along with other sensor data, and observe that video data and other sensor data on one or more monitors attached to a user stations or on one or more monitors affixed to a wall of a building. The user observes this data that is received from a protected building to conduct surveillance for potential intruders or other security or safety issues.

Augmented reality, virtual reality and mixed reality technologies are known. Generally, virtual reality refers to technologies that replicate an environment with a simulation of a user being immersed in the replicated environment. Augmented reality, generally refers to technologies that present a view of a real-world environment augmented with computer generated data. Mixed reality a relatively new term generally involves technologies that involve a merging of real world and virtual world environments where real and virtual objects exist and interact.

SUMMARY

According to an aspect, a system includes a server computer system that receives video feeds from plural, fixed video cameras in a facility, the server computer system including a storage device that stores a program of computing instructions for execution by server computer system, the program comprising instructions configured to cause the server computing system to control a mixed reality system comprising a processor device and a memory in communication with the processor device, and a head mounted display device including a stereoscopic 3D display, with the mixed reality system configured to send requests to the server system for specified video feeds, receive the video feeds, receive user instructions to pin a specific one of the feeds to a particular position as rendered on the display, and render using the head mounted display device, the specific one of the feeds onto the particular position.

Aspects also include computer program products and computer implemented methods.

One or more of the following advantages may be provided by one or more of the above aspects.

Disclosed are techniques that use mixed reality and/or augmented reality and virtual reality technologies to improve the analysis of security and other situations. The disclosed techniques use computer implemented techniques that obtain information from various electronic systems/devices in the physical world, which devices are exemplified by security systems, and merge that information into a virtual world of policies and analytics that involve such security systems.

The details of one or more embodiments of the invention are set forth in the accompanying drawings and the description below. Other features, objects, and advantages of the invention is apparent from the description and drawings, and from the claims.

DESCRIPTION OF DRAWINGS

FIGS. 3-4 are flow charts depicting application processing using mixed reality systems with security systems.

DETAILED DESCRIPTION

Figure 1:
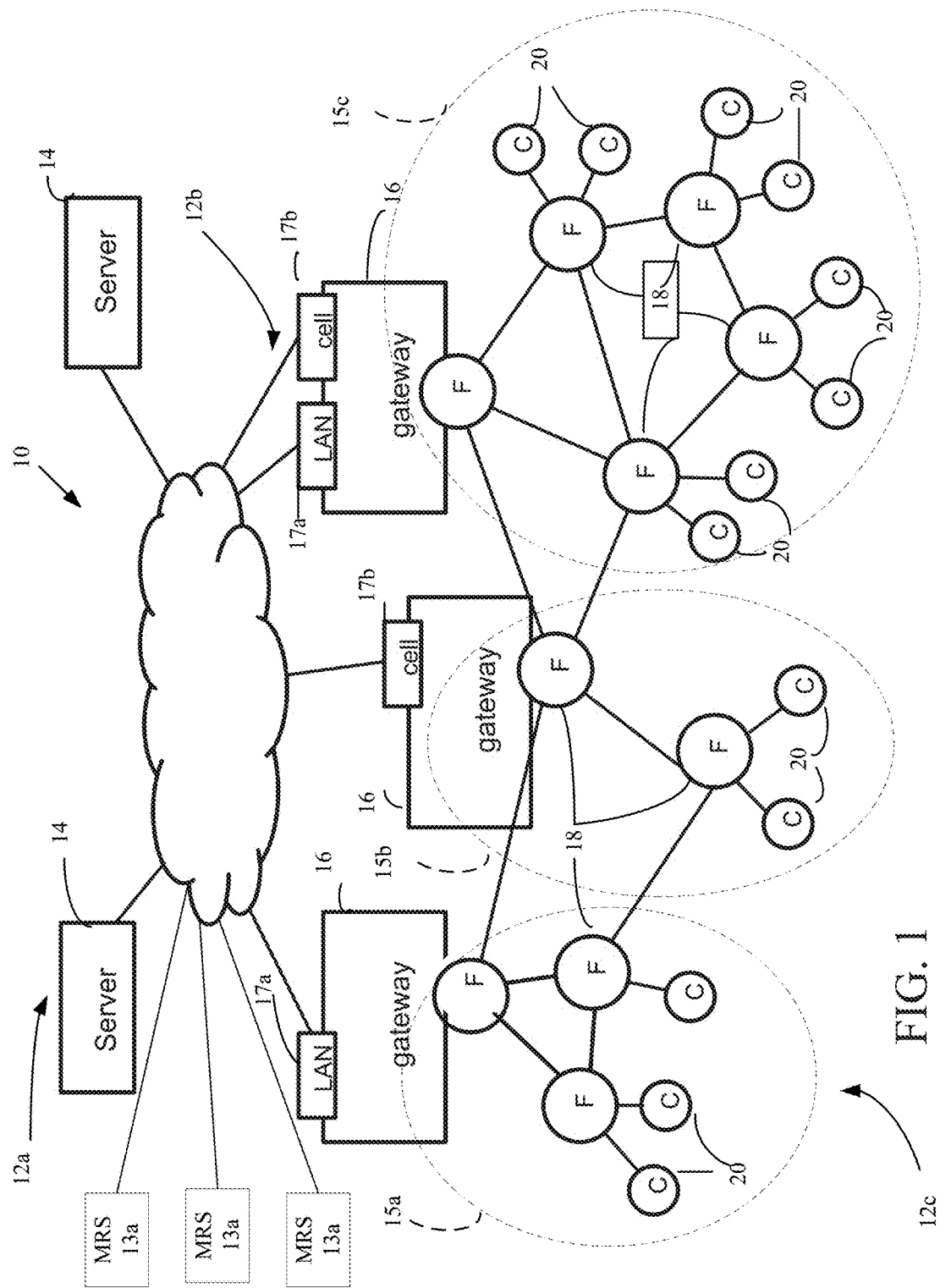
FIG. 1 is a schematic diagram of an exemplary networked security system.

As shown in FIG. 1, described herein are examples of an integrated platform 10 that integrates via a distributed network 11, mixed reality devices 13a-13c with security/intrusion/alarm/surveillance systems 15a-15c (typically including sensors 20, functional nodes 18 and typically including a panel not shown).

Examples of mixed reality devices 13a-13c are those in which the mixed reality devices incorporate a live, real world presentation of elements of the physical real-world with virtual elements that are calculated or produced from inputs and which are rendered on a display so that to a user these calculated or produced elements are perceived to exist together with the physical real world in a common environment. Examples of such mixed reality devices 13a-13c include mixed reality devices such as Hololens® (Microsoft), (a smart-glasses, cordless, Windows 10® (Microsoft) computer headset that includes various sensors and a high-definition stereoscopic 3D optical head-mounted display, and spatial sound to allow for augmented reality applications. Other mixed reality devices/augmented reality systems such as Google Glass® (Google) could be used. There are many such systems on the market of which these are two examples.

The security systems 15a-15c typically include a panel (not shown), such as for an intrusion detection system, an intrusion detection panel wired or wirelessly connected to a variety of sensors deployed in a facility. Typically, such panels receive signals from one or more of these sensors to indicate a current state or value or that a particular condition being monitored has changed or become unsecure.

The integrated platform 10 includes data collection systems that are coupled to wireless sensor networks and wireless devices, with remote server-based monitoring via servers 14 and report generation. As described in more detail below, wireless sensor networks generally use a combination of wired and wireless links between computing devices, with wireless links usually used for the lowest level connections (e.g., end-node device to hub/gateway 16). In an example network, the edge (wirelessly-connected) tier of the network is comprised of resource-constrained devices 20 with specific functions. These devices 20 may have a small-to-moderate amount of processing power and memory, and may be battery powered, thus requiring that they conserve energy by spending much of their time in sleep mode. A typical model is one where the edge devices 20 generally form a single wireless network in which each end-node communicates directly with its parent node (e.g., 18) in a hub-and-spoke-style architecture. The parent node may be, e.g., an access point on a gateway or a sub-coordinator which is, in turn, connected to the access point or another sub-coordinator.

In FIG. 1, the distributed network 11 is logically divided into a set of tiers or hierarchical levels 12a-12c. The mixed reality devices 13a-13n are shown in communication with the top one or two tiers or hierarchical levels 12a-12c. In FIG. 1, the lower level tier 12c is illustrated divided into different facility 19a-19c for ease in explaining details of the applications that will be discussed below. The facility 19a-19c are each associated with one of the security systems 15a-15c. The security systems can be independent meaning that there are no connections (as shown) among fully functional nodes of different facility or dependent meaning that there are connections (not shown) among fully functional nodes of different facility.

In the upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 11 has direct links between devices (nodes) as shown and discussed below. Servers 14 execute analytics (analysis programs of various sorts) that are managed in concert with a session manager system 80 (FIG. 4). The servers 14 can access a database 23.

The second logically divided tier or hierarchical level 12b, referred to here as a middle tier, involves gateways 16 located at central, convenient places inside individual buildings and structures, e.g., 13a-13c. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b. Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 11.

The distributed network 11 implements a state machine approach to an application layer that runs on the lower tier devices 18 and 20. States in the state machine are comprised of sets of functions that execute in coordination, and these functions can be individually deleted or substituted or added to in order to alter the states in the state machine of a particular lower tier device. The state function based application layer uses an edge device operating system that allows for loading and execution of individual functions (after the booting of the device) without rebooting the device (so-called "dynamic programming"). In other implementations, edge devices could use other operating systems provided such systems allow for loading and execution of individual functions (after the booting of the device) preferably without rebooting of the edge devices.

Figure 2:
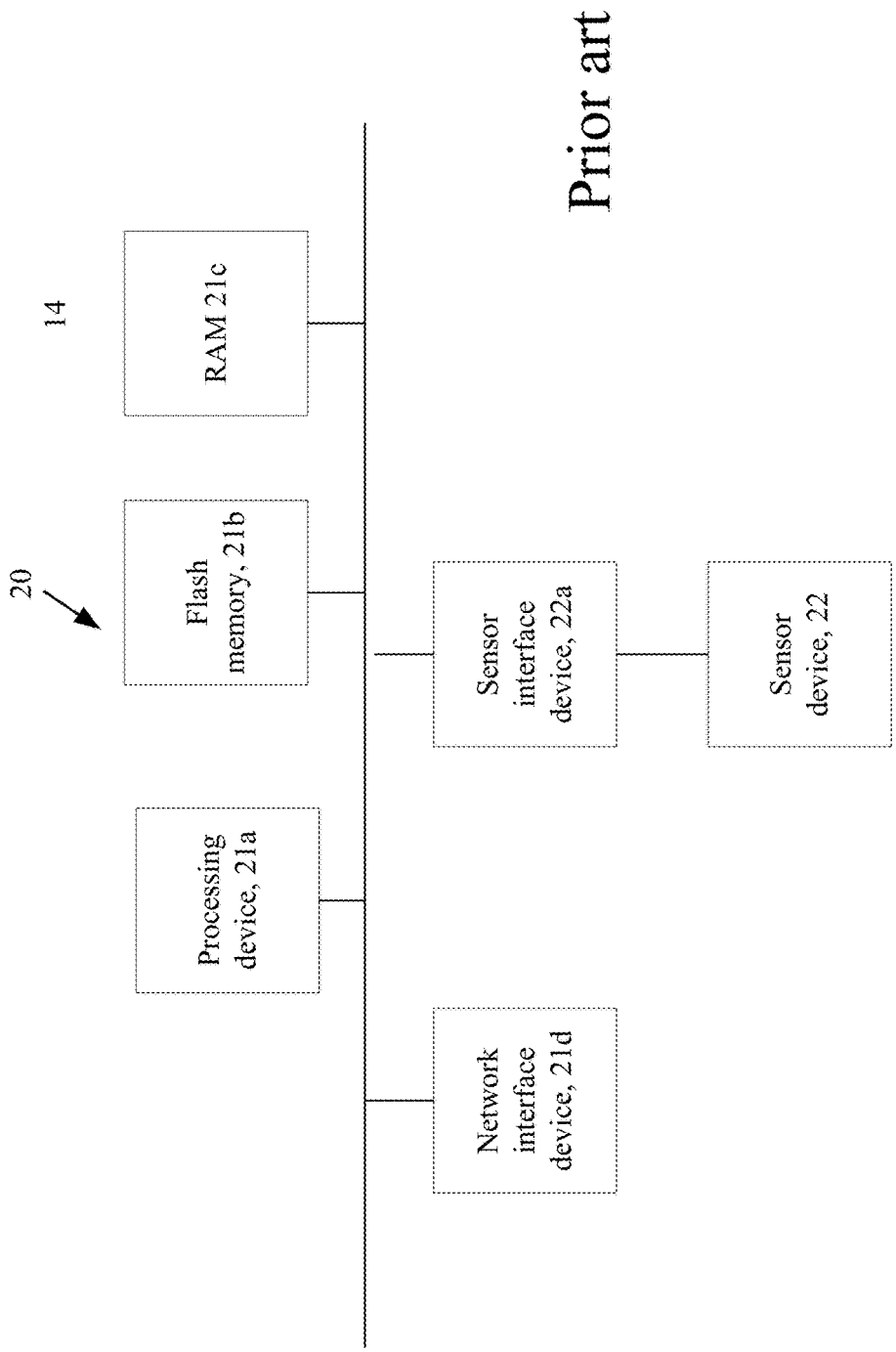
FIG. 2 is a block diagram of generally conventional constrained device.

Referring to FIG. 2, a generic constrained computing device 20 that is part of the security/intrusion/alarm/surveillance systems (either integrated examples of such system or standalone examples) is shown. A constrained device 20 as used herein is a device having substantially less persistent and volatile memory other computing devices, sensors, systems in a particular networked detection/sensor/alarm system. Constrained device 20 includes a processor device 21a, e.g., a CPU and or other type of controller device that executes under an operating system, generally with 8-bit or 16-bit logic rather than the 32- and 64-bit logic used by high-end computers and microprocessors. The constrained device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less.

The constrained device 20 has a network interface card 21d that interfaces the constrained device 20 to the network 11. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The constrained device 20 also includes a sensor 22 and a sensor interface 22a that interfaces to the processor 21a. Sensor 22 can be any type of sensor type device. Typical types of sensors include temperature, simple motion, 1- 2- or 3-axis acceleration force, humidity, pressure, selective chemical, sound/piezo-electric transduction, and/or numerous others, implemented singly or in combination to detect complex events.

The disclosed implementations of a constrained device 20 can follow the current constraints on flash/persistent storage memory and RAM memory and less than 10-20 kilobytes of RAM/volatile memory, but can have more depending on configuration and in some instances the operating system. These constrained devices 20 are configured in this manner; generally due to cost/physical configuration considerations. These types of constrained devices 20 generally have a static software image (i.e., the logic programmed into the constrained device is always the same).

Constrained devices 20 execute a real-time operating system that can use dynamic programming and support. The real-time operating system ("RTOS") executes and otherwise manages a dynamic set of user-defined independent executable functions or tasks that are either built into a loaded image (software and RTOS that executes on the constrained device) or that are downloaded during normal operation of the constrained device 20 or a combination of the two, with the former (built into the image) using as subroutines instances of the latter (downloaded during operation). Certain of the applications set forth below will cause systems to access these constrained devices 20 to upload data and otherwise control the devices 20 according to needs of the applications.

In the examples below, a facility can be any type but is typically, e.g., a commercial, industrial, facility, with interior areas, (buildings) and exterior areas that are subject to surveillance and other types of monitoring. The buildings can be of any configuration, wide open spaces such as a warehouse, to compartmentalized facilities such as labs/offices.

Referring now to FIG. 3, using mixed reality system technology and using mixed reality device 13a as an example, a virtual "holographic guard tour" is provided. Cloud servers 14 receive 32 from a given facility, a plurality of video feeds, each of which originates from a corresponding plurality of surveillance cameras at the given facility. Included with the video feeds are data including location data that specifies the location and an identification data that identifies the surveilling camera. The cloud servers 14 process 34 these data using convention processing analytics for determining either potential of alarm conditions or verification of asserted alarm conditions. At least some of these feeds received by the cloud servers are sent 36 by the cloud servers 14 to corresponding mixed reality devices 13a-13c that are worn by personnel, e.g., personnel at monitoring centers. In some instances the mixed reality devices 13a-13c send messages to the servers 14 to send specified video feeds from specified cameras to the corresponding mixed reality device 13a.

Referring now to FIG. 4, these feeds are received 52 from the cloud servers by the corresponding mixed reality devices 13a-13c. The personnel at monitoring centers can access the video feeds in an organized manner (along with other sensor data from sensors in proximity to such cameras deployed in a given surveilled facility, e.g., a building or a facility). The mixed reality device 13a enters a mode in which personnel at the monitoring centers arrange 54 the video feeds and other sensor data on a virtual wall of "video monitors." That is, the feeds are rendered in the display of the corresponding mixed reality device 13a as being affixed to the virtual wall at fixed locations in a display generated by the corresponding display device of the mixed reality devices 13a, as shown in FIG. 5.

The user observes this data that is received from a protected building to conduct surveillance for potential intruders or other security or safety issues. As these feeds are pinned to the same section of the virtual wall, so that when monitoring personnel are ready to view the feeds, the feeds are rendered in the same positions on the wall, each time the video is rendered.

A user can select one of the virtual video monitors on the wall for closer examination. That is, the user of the mixed reality device 13a can cause the mixed reality device 13a to enter a mode by which cameras on the mixed reality device 13a, capture user gestures that signal the mixed reality device 13a to select 56 one of the virtual monitors to be rendered on the display while removing others, in order that detailed observations can be made by the user. Upon receiving a selection of the virtual monitor, the mixed reality device 13a wipes 58 the display clear of the prior display and places the selected virtual monitor in the display, so that the user can focus in on a signal display from a single camera.

At various stages and in various modes, monitoring personnel view 60 the feeds at the locations through mixed reality device. The mixed reality devices 13a-13c pull other data from the servers 14 or the servers push other data to the mixed reality devices 13a-13c. Video sensor positioning (camera positioning) can be controlled 62 via mixed reality devices 13a-13c to vary a field of view through the display on the mixed reality devices 13a-13c and to otherwise control actions from the mixed reality devices, either via command or gestures or controls or voice commands.

The user of the mixed reality device 13a can cause the mixed reality device 13a to enter another mode by which again using cameras on the mixed reality device 13a, the user can signal the cloud computers to control positioning of camera (assuming that the camera is repositionable type of camera, e.g., a camera that is mounted on a swivel mount. In this aspect, the camera on the mixed reality device 13a receives the gesture commands through images. The mixed reality device 13a either sends commands derived from a translation of the captured images or sends the images directly to the cloud servers, which translate the images into the commands. The commands are formed into signals that are sent from the cloud servers to the corresponding camera to control positioning of the camera.

Figure 5A:
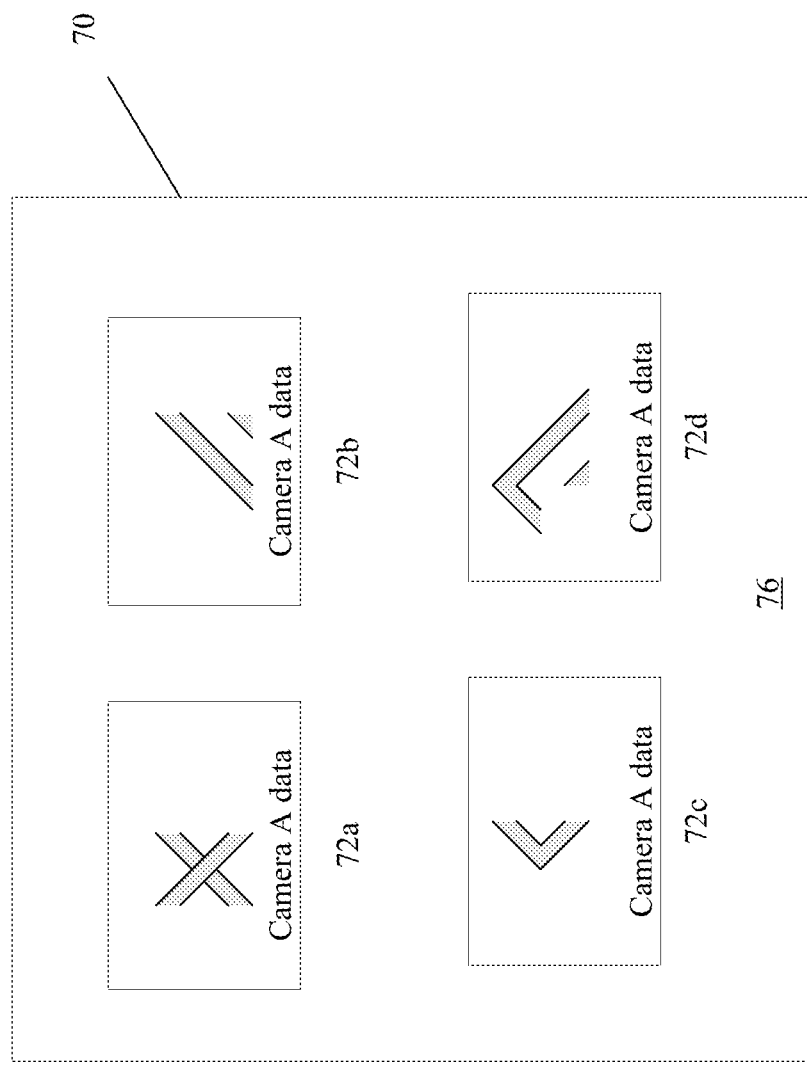
FIGS. 5A, 5B are views seen in a display of a mixed reality device.
Figure 5B:
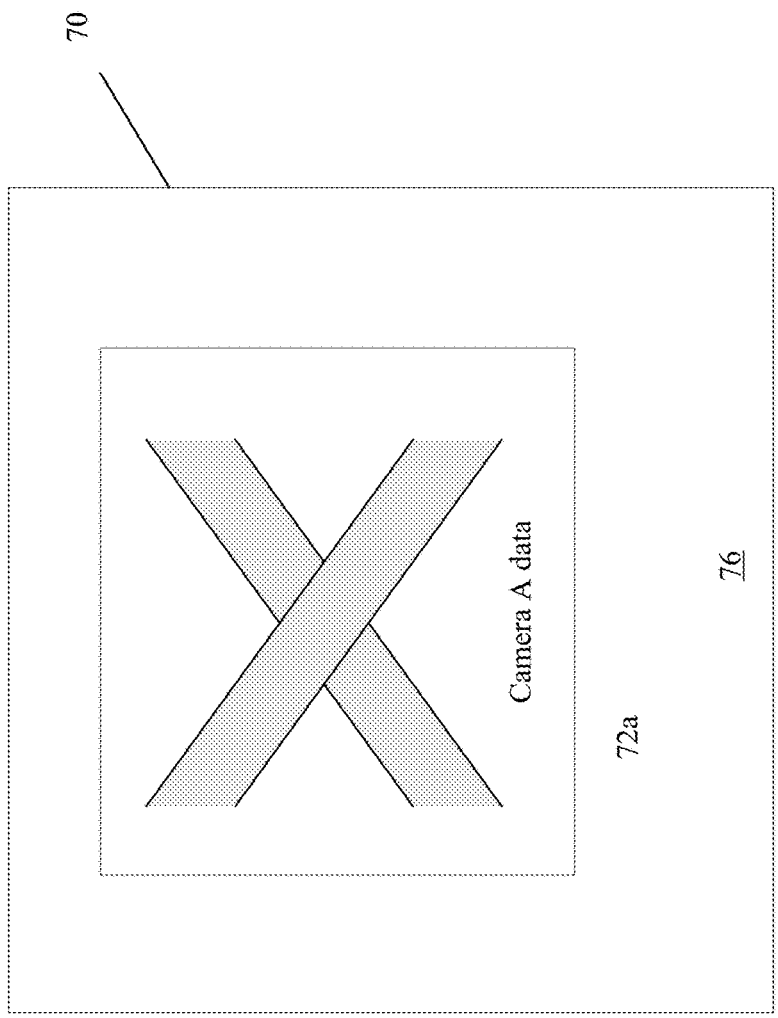

Referring now to FIG. 5A, the display 70 of the mixed reality device 13a is shown. In display 70 is rendered, here four video feeds 72a-72d are illustrated and that are affixed to sections of a virtual wall 76. As shown in FIG. 5B, selection of the video feed 72a as illustrated renders the video feed 72a as illustrated as occupying a substantial portion of the virtual wall 76.

In some implementations, especially for larger facilities, the cloud computers, using conventional modeling processes, construct a virtual, visual 3D model of the facility. This model is rendered for viewing in the mixed reality devices 13a-13c. Clicking on areas of the facility allows the monitoring employee to view corresponding camera feeds from the corresponding areas of the building.

A guard tour can be performed using drone based camera system (or other portable based systems). The surveillance system uses one or more UAV's or drones. A UAV (unmanned aerial vehicle) commonly known as a drone is a remotely piloted airborne vehicle, i.e., an aircraft that does not have a human pilot aboard. However, a human controls the flight of the drone remotely or in some applications the flight of the drone is controlled autonomously by onboard computers. The display in the mixed reality system receives a video feed from a camera carried by the drone. A mechanism for steering the drone around the facility is provided such as by use of waypoints.

The drone navigates via waypoint stations that provide bases for one or more of the plural drones. The system also includes a cloud based server that is in communication with the drones and a gateway to send data to and receive data from a remote, central monitoring station (also referred to as central monitoring center) via one or more data or communication network, such as the Internet; the phone system or cellular communication system being examples of others. The server receives signals from the plural drones. These signals include video signals from onboard cameras as well as location information. Navigation of such drones can be provided as disclosed in U.S. Pub. No. US-2016-0116914-

A1, incorporated herein by reference. The drone takes the place of the "live" security guard.

The drones can carry several types of sensor/detectors. One type of sensor is a video camera that sends video data to the server. Examples of other types of sensors include microphones to send audio data. The sensors communicate wirelessly via an on-board computer on the drone to the gateways up to the cloud based servers. In general, sensors capture audio and video and send signals to the servers.

The mixed reality system is configured for a specific drone or set of drones, such that the mixed reality system receives preconfigured video feeds from the drone(s) that are pinned to the same location on a wall. The drones can be assigned routes and can have various modes such as hover mode, track mode, etc. Drone cameras can be pulled into the mixed reality system either by the mixed reality system being preconfigured to specific drones or the mixed reality system upon commands (gestures, selections on the mixed reality system, etc.) by the user to select specific drones.

Figure 6:
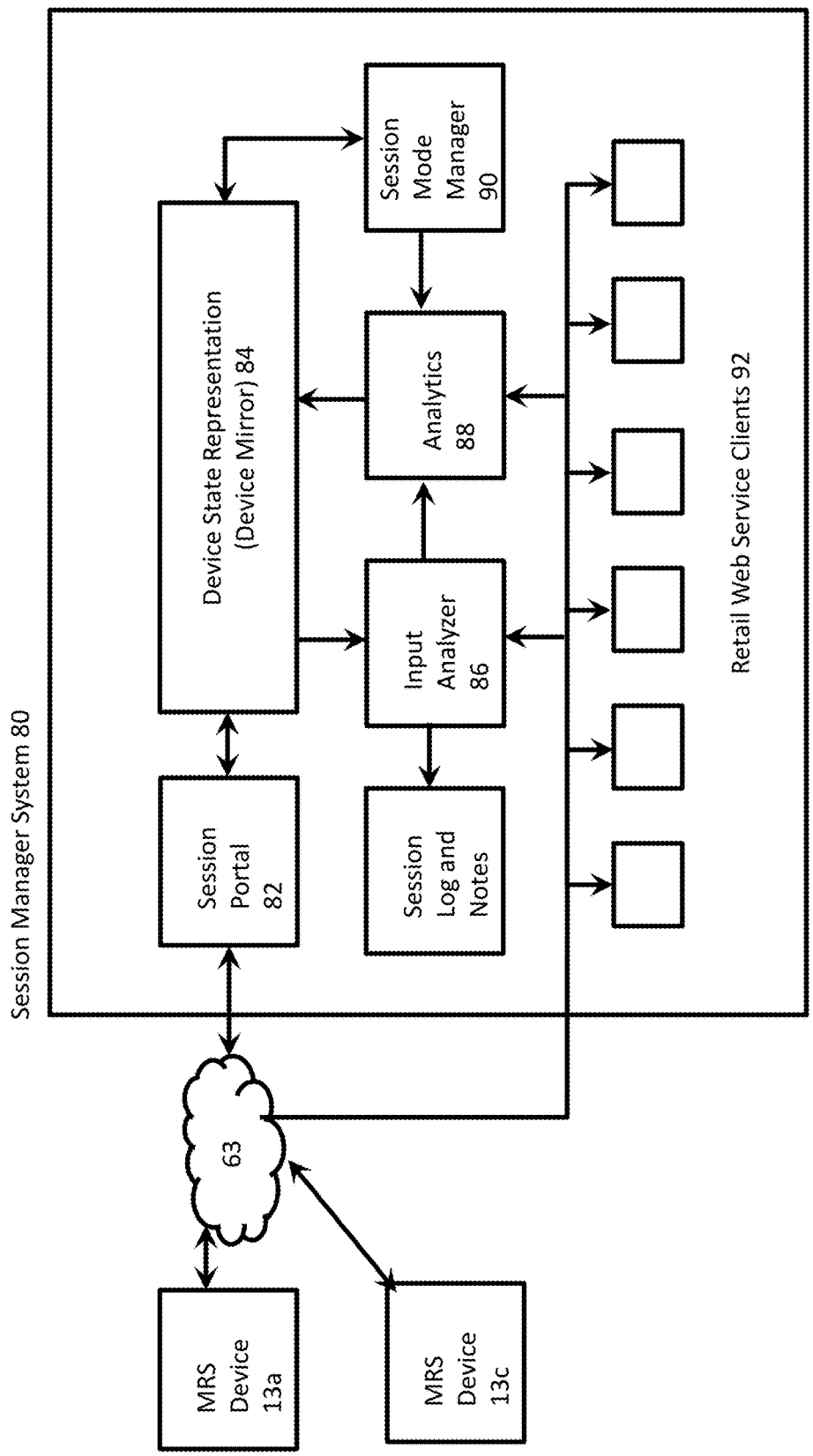
FIG. 6 is a block diagram of a session manager.

Referring now to FIG. 6, an AR/VR (mixed reality) session manager system 80 (session manager) 80 that executes on the servers 14 is shown. The session manager 80 interacts with the mixed reality devices 13a-13c over the Internet using a "session portal" 82, e.g., a web service (application programming interface (API) or in another embodiment, a dedicated socket with SMTP or other transfer protocol. The session portal 82 is bi-directional meaning that each of the mixed reality devices (MRS) 13a-13c can send data to the session manager 80 and receive data from the session manager 80. The mixed reality devices (MRS) 13a-13c send updates on their states to the session manager 80. The states of the mixed reality devices 13a-13c are represented virtually or "mirrored" in a device state representation 84 inside the session manager 80.

Input from the mixed reality devices (MRS) 13a-13c to the session manager 80 is used in analytic programs executed on the servers 14. For example, while cameras in the facility can be sending video feeds to the servers that send relevant data to the mixed reality devices (MRS) 13a-13c, cameras on the mixed reality device 13a-13c may send video of an area showing the current state of the facility being monitored by the security system. This video can be analyzed by input analyzer 86 using various techniques to inform analytical manager 88 that inputs to analytic programs (not shown) executing on the servers 14. The analytics manager 88 uses a current mode and inputs presented to it, in order to decide what to present (virtually) to the user on the device viewer and what to request of the analytics executing on the server. Information presented is produced by the analytics manager using data received from the various analytical programs that execute various analytics both conventional as well as to be developed. The session mode manager 90 monitors the mode selected by the user (as mirrored in the device state representation) and informs the analytics manager of the selection. Session logs and notes (not referenced) can also be stored.

In some embodiments, the session may be logged by the input analyzer 86, including any notes or annotations provided by at least some users of the mixed reality devices 13a-13c, e.g., verbal or text sent from the mixed reality devices 13a-13c or otherwise. This locale log/record in the session manager 80 may be backed up in an external database 23 or other databases (not shown) for long-term storage, reporting, and further analysis. This local session and long-term storage may also include a full record or "recording" of part or all of the session, rather than just the user notes.

The mixed reality device 13a-13c can be controlled via a switch on the device, a voice command, and/or a hand gesture that can be used to awakens the device (i.e., loads operating system components and prepares for input) when the device senses motion or can be used to request inputs to the device from the servers 14. The device may require input of a user id and password to enable further operation and interaction with the user and servers 14.

The sensor network illustrated in FIG. 1, is an example of a network that collects and analyzes data from various sensor devices. Other configurations of servers and gateways can be used. In addition, the session manager system 80 can be implemented in the servers 14 or in local or detached server systems.

The servers 14 can be any of a variety of computing devices capable of receiving information, such as a server, a distributed computing system 10, a rack-mounted server and so forth. Servers 14 may be a single server or a group of servers that are at a same location or at different locations. Servers 14 can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Other embodiments are within the scope of the following claims.

What is claimed is:

1. A system, comprising:
server computer systems that receive video feeds from plural fixed video cameras in a facility, the server computer systems including a storage device that stores a program of computing instructions for execution by server computer system, the program comprising instructions configured to cause the server computer system to:
construct a virtual, visual 3D model of the facility, the virtual, visual 3D model comprising areas selectable by a user corresponding to areas of the facility; and
control a mixed reality system comprising a processor device and a memory in communication with the processor device, and a head mounted display device including a stereoscopic 3D display; with the mixed reality system configured to:
render using the head mounted display device the virtual, visual 3D model of the facility;
receive, from a camera of the head mounted display device, images indicating hand gestures of a user of the head mounted display device;
determine a plurality of commands by translating the images to identify the gestures;
receive a first command of the plurality of commands to monitor video feeds associated with a specified area of the facility via selection of an area within the virtual, visual 3D model corresponding to the specified area;
send requests to the server computer system for the video feeds associated with the specified area of the facility;
receive the video feeds;
receive a second command of the plurality of commands to pin a specific one of the video feeds to a particular position as rendered on the stereoscopic 3D display; and
render using the head mounted display device, the specific one of the video feeds to occupy a substantial portion on the stereoscopic 3D display by clearing any of the video feeds but the specific video feed from the stereoscopic 3D display.

2. The system of claim 1 wherein included with the video feeds are data including location data that specifies a location and an identification data that identifies a surveilling camera.

3. The system of claim 2 wherein the server computer systems process the data using convention processing analytics for determining either potential of alarm conditions or verification of asserted alarm conditions.

4. The system of claim 1 wherein personnel access the video feeds in an organized manner by the mixed reality system being configured to:
execute a mode that arranges the video feeds and other sensor data on a virtual wall of video monitors that is rendered in the stereoscopic 3D display of the mixed reality system.

5. The system of claim 4 wherein the video feeds are rendered in the stereoscopic 3D display of the corresponding mixed reality system as being affixed to the virtual wall at a fixed location in the display generated, by the corresponding mixed reality system, in response to a user pin command received from the user.

6. The system of claim 4 further configured to:
receive from a user a selection of the virtual wall of one of the video monitors for closer examination.

7. The system of claim 6 further configured to:
cause the mixed reality system to enter a mode by which the camera of the head mounted display device captures user gestures that signal the mixed reality system to select the one of the virtual monitors.

8. The system of claim 7 further configured to:
clear the stereoscopic 3D display upon receiving a selection of the virtual monitor and place the selected virtual monitor in the stereoscopic 3D display.

9. The system of claim 1 further comprising:
a session manager that controls interactions with the mixed reality system over the Internet using a "session portal" that includes a web service API or a dedicated socket with a transfer protocol.

10. A method performed by a mixed reality system comprising a head mounted display device including a stereoscopic 3D display, comprising:
rendering using the head mounted display device a virtual, visual 3D model of a facility, the virtual, visual 3D model comprising areas selectable by a user corresponding to areas of the facility;
receiving, from a camera of the head mounted display device, images indicating hand gestures of a user of the head mounted display device;
determining a plurality of commands by translating the images to identify the gestures;
receiving a first command of the plurality of commands to monitor video feeds associated with a specified area of the facility via selection of an area within the virtual, visual 3D model corresponding to the specified area;
sending requests to a server system for the video feeds associated with the specified area of the facility;
receiving the video feeds;
receiving a second command of the plurality of commands to pin a specific one of the video feeds to a particular position as rendered on the stereoscopic 3D display; and
using the head mounted display device to render the specific one of the video feeds to occupy a substantial portion on the stereoscopic 3D display by clearing any of the video feeds but the specific video feed from the stereoscopic 3D display.

11. The method of claim 10, wherein the video feeds are data including location data that specifies a location and an identification data that identifies a surveilling camera.

12. The method of claim 11, wherein the server computer system process the data using convention processing analytics for determining either potential of alarm conditions or verification of asserted alarm conditions.

13. The method of claim 10, further comprising:
executing a mode that arranges the video feeds and other sensor data on a virtual wall of video monitors that is rendered in the stereoscopic 3D display of the mixed reality system.

14. The method of claim 13, wherein the video feeds are rendered in the stereoscopic 3D display of the corresponding mixed reality system as being affixed to the virtual wall at a fixed location in the display generated, by the corresponding mixed reality system, in response to a user pin command received from the user.

15. The method of claim 13, further comprising:
receiving from a user a selection of the virtual wall of one of the video monitors for closer examination.

16. The method of claim 15, further comprising:
entering a mode by which the camera of the head mounted display device captures user gestures that signal the mixed reality system to select the one of the virtual monitors.

17. The method of claim 16, further comprising:
clearing the stereoscopic 3D display upon receiving a selection of the virtual monitor and placing the selected virtual monitor in the stereoscopic 3D display.

18. A mixed reality system, comprising:
an interface coupled to at least one server computer that receives video feeds from video cameras in a facility;
a storage device that stores a program of computing instructions for execution a processor, the program comprising instructions configured to a head mounted display device including a stereoscopic 3D display to:
render using the head mounted display device a virtual, visual 3D model of the facility, the virtual, visual 3D model comprising areas selectable by a user corresponding to areas of the facility;
receive, from a camera of the head mounted display device, images indicating hand gestures of a user of the head mounted display device;
determine a plurality of commands by translating the images to identify the gestures;
receive a first command of the plurality of commands to monitor video feeds associated with a specified area of the facility via selection of an area within the virtual, visual 3D model corresponding to the specified area;
send request to the server for the video feeds associated with the specified area of the facility;
receive the video feeds;
receive a second command of the plurality of commands to pin a specific one of the video feeds to a particular position as rendered on the stereoscopic 3D display; and
render using the head mounted display device, the specific one of the video feeds to occupy a substantial portion on the stereoscopic 3D display by clearing any of the video feeds but the specific video feed from the stereoscopic 3D display.

19. The system of claim 18, wherein the video feeds comprise data comprising location data that specifies a location and an identification data that identifies a surveilling camera.

20. The system of claim 18, wherein the mixed reality system is configured to:
execute a mode that arranges the video feeds and other sensor data on a virtual wall of video monitors that is rendered in the stereoscopic 3D display of the mixed reality system.

* * * * *